G. S. BAKER & G. W. PERKS.
MACHINE FOR MOLDING CHOCOLATE AND THE LIKE.
APPLICATION FILED APR. 6, 1909.

947,405.

Patented Jan. 25, 1910.

3 SHEETS—SHEET 1.

G. S. BAKER & G. W. PERKS.
MACHINE FOR MOLDING CHOCOLATE AND THE LIKE.
APPLICATION FILED APR. 6, 1909.

947,405.

Patented Jan. 25, 1910.
3 SHEETS—SHEET 3.

Witnesses:
A. J. Hadden
A. L. Hathaway

Inventors.
George Samuel Baker
George William Perks
by R. Hadden Attorney

UNITED STATES PATENT OFFICE.

GEORGE SAMUEL BAKER AND GEORGE WILLIAM PERKS, OF LONDON, ENGLAND.

MACHINE FOR MOLDING CHOCOLATE AND THE LIKE.

947,405.   Specification of Letters Patent.   Patented Jan. 25, 1910.

Application filed April 6, 1909. Serial No. 488,236.

*To all whom it may concern:*

Be it known that we, GEORGE SAMUEL BAKER and GEORGE WILLIAM PERKS, both subjects of the King of England, residing at London, in England, have invented certain new and useful Improvements in Machines for Molding Chocolate and the Like, of which the following is a specification.

This invention relates to machines for molding chocolate and the like and the object is primarily to provide a machine for the production of hollow chocolate eggs produced by causing the chocolate to flow around the interior of a mold in such a manner that all parts of the mold are covered with a uniform layer or thickness of chocolate, this result being produced by mounting the molds in a series of clips carried by a rotatable drum which is also capable of longitudinal rocking movements as hereinafter fully described, reference being made to the accompanying drawings in which—

Figure 1:
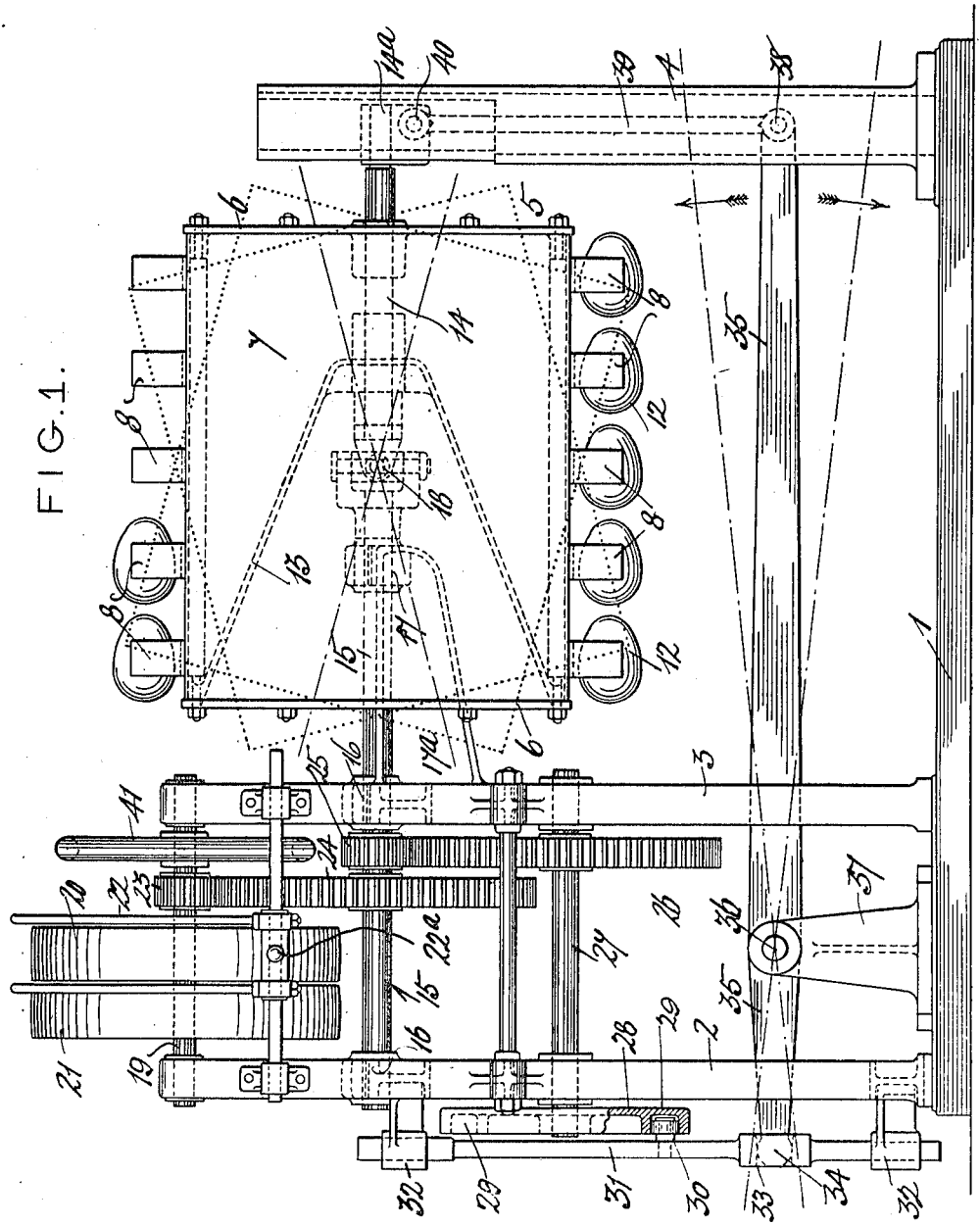
Figure 2:
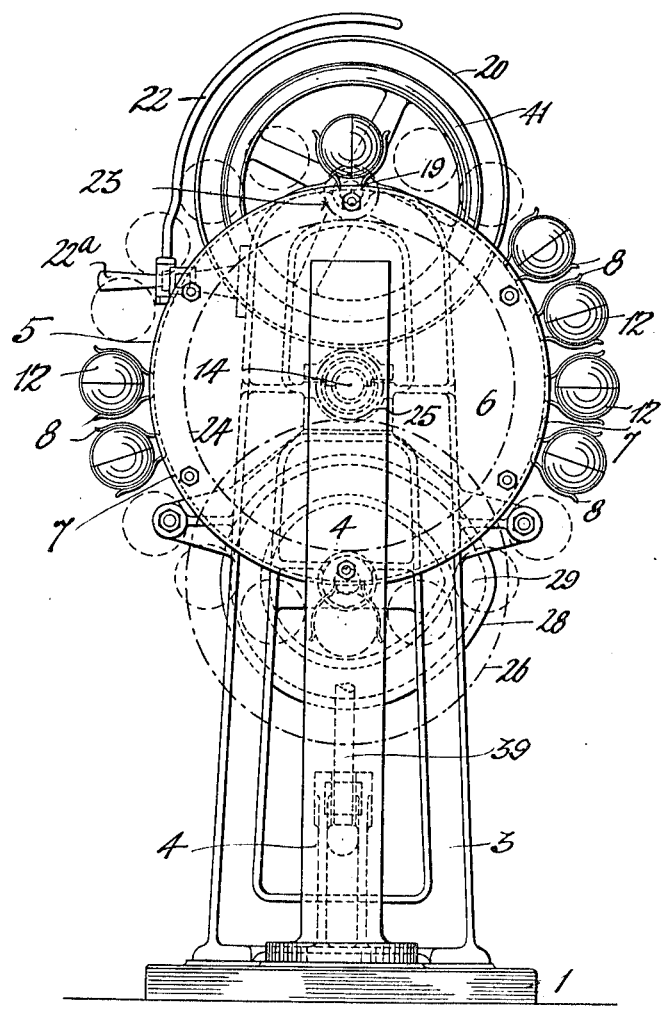
Figure 3:
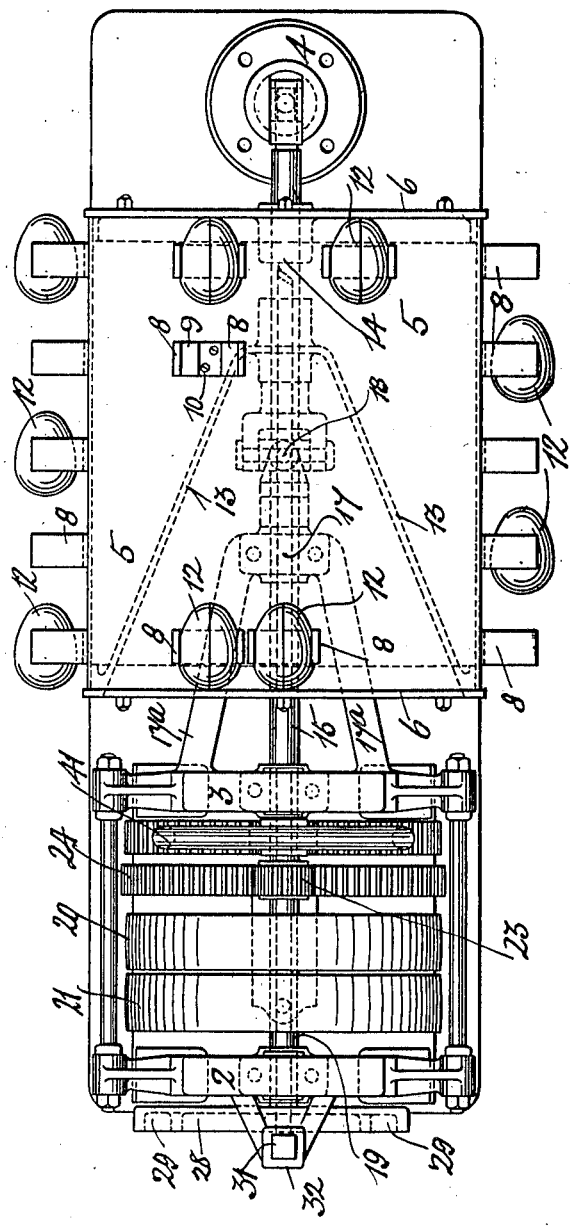

Figure 1 is a side elevation of the complete machine. Fig. 2 is an end view thereof with certain of the molds omitted for clearness of illustration, and Fig. 3 is a plan view.

The machine comprises the base 1 from which extend the standards 2, 3 and 4, the two former supporting the necessary gearing and mechanism for operating the machine as hereinafter described, and the latter being hollow throughout its length. Between the standards 3 and 4 is mounted the drum 5 consisting of solid end members 6, 6 and two or more removable sheet metal peripheral sections 7, 7 secured to said end members in any convenient manner. To the peripheral sections 7, 7 are permanently secured a plurality of clips 8 of any convenient construction, but preferably comprising two curved or cupped members having overlapping flanges 9 which are attached to the sections 7 as by screws 10 or equivalents. The said clips are for the reception of the molds 12 which in the form illustrated are of two part construction divided and hinged along the major axis.

To one of the end members is bolted a cone 13 the smaller end of which is traversed by a shaft 14, the outer end of which is carried by a bearing block 14ª mounted to have sliding movement within the standard 4 which is made hollow for this purpose. Within the cone there also extends a second shaft 15 supported in bearings 16 in the standards 2 and 3 and also by a further bearing 17 at the end of a bracket 17ª extending from said standard 3. The two shafts 14 and 15 are coupled together by a universal joint 18 so that rocking movement about said joint may be imparted to the drum 5 in either direction, as shown by the broken lines in Fig. 1, in the manner hereinafter described. At the upper part of the standards 2, 3 is mounted the shaft 19 carrying the fast and loose pulleys 20 and 21 respectively, a fork 22 capable of operation by the handle 22ª being provided as shown for shifting the driving belt (not shown) from one pulley to the other in the known manner. Upon said shaft 19 is keyed a pinion 23 meshing with a spur wheel 24 on the shaft 15 whereby rotation is imparted to the drum 5. Upon said shaft 15 is a pinion 25 meshing with a spur wheel 26 carried by a shaft 27 mounted in the standards 2, 3. On the extremity of the shaft 27 outside the standard 1 is keyed a cam 28 having a groove 29 in which engages a roller 30 rotatably mounted in a rod 31 slidably carried in bearings 32, 32 extending from the standard 1, said rod being provided with a perforated enlargement 33 in which engages the spherical end 34 of a horizontal lever 35 fulcrumed at 36 upon a bracket 37 and the opposite end of which is pivotally connected at 38 to a vertical rod 39 extending upward within the standard 4 and the opposite end of which is pivoted at 40 to the aforesaid sliding block 14ª. A hand wheel 41 is also keyed to the shaft 19 to permit of rotating the drum 5 through the gears 23, 24 and shaft 15, universal joint 18 and shaft 14 when required.

The operation of the machine is as follows. Before or during continuous rotation of the drum 5 the molds 12 charged with chocolate of the desired consistency are placed in the clips 8 on the periphery of said drum and during such rotation the drum is also caused to rock about the universal joint 18 in the manner previously indicated through the medium of the cam groove 29, roller 30, rod 31, lever 35, rod 39, block 14ª and shaft 14. The character of this rocking movement is dependent on the profile of the cam groove 29 and may be varied at will according to the size of the mold or other conditions by replacing the cam by one having a groove of the desired profile. In the case of the cam illustrated, more particularly in Fig. 2, and with the gearing shown which is in the ratio of 5 to 1 between the drum and cam shafts 15 and 27 respectively, the following movements of the drum 5 may be produced, viz. one revolution with the drum inclined having one end thereof in its lowest position, one revolution and a half during which said drum is rocked to bring said end to its highest position, one revolution during which said drum remains with said end in its uppermost position and a further revolution and a half during which the drum is rocked to its initial position. It will thus be seen that the chocolate is caused to flow completely around and from end to end within the molds thus producing a uniform layer over the interior surfaces thereof. When the sequence of movements of the drum described have taken place the molds may be removed from the clips and replaced by others.

The clips on each section may be disposed to accommodate molds all of one size or of varying sizes if required, but in practice the former is more general since different sizes of mold usually require different rocking movements of the drum which as aforesaid are produced by cams having grooves of different contour.

We do not limit ourselves to the construction and arrangement of parts hereinbefore described and illustrated since the same may be varied within limits determined by the following claims without departing from the spirit of the invention.

What we claim as our invention and desire to secure by Letters Patent of the United States is:—

1. In a machine of the character described, the combination of a drum, means for the reception of molds on the periphery thereof, means for rotating said drum and means for imparting rocking movements thereto during such rotation.

2. In a machine of the character described, the combination of a drum comprising end members and removable peripheral sections, clips carried by said sections for reception of molds, means for rotating said drum about its axis, and means for imparting symmetrical rocking movements thereto about a point at the center of said axis during such rotation.

3. In a machine of the character described, the combination of a drum, means on the periphery thereof for the reception of molds, a bipartite shaft connected to said drum, means for imparting continuous rotary movement to said shaft, a universal joint at the junction of the shaft members, and means for imparting oscillating movements to one member of the shaft during the rotation of the drum, for the purpose specified.

4. In a machine of the character described, the combination of a drum comprising two end members and removable peripheral sections, clips carried by said sections for reception of molds, a conical member within the drum connected to one of said end members, a shaft traversing and connected to said latter end member, a second shaft traversing and connected to the other end member and said conical member, a universal joint at the junction of said shafts, means for imparting continuous rotary movement to said shafts and means for imparting oscillating movements to said last named shaft about the aforesaid universal joint.

5. In a machine of the character described, the combination of a drum comprising end members and peripheral sections, clips secured to said sections for reception of molds, a bipartite shaft connected to said drum, a universal joint at the junction of said shaft members, means for imparting continuous rotation to said shaft, a cam shaft, a cam thereon, reducing gearing between the drum shaft and cam shaft, and a rocking lever operated by said cam adapted to impart oscillating movements to one of said shaft members about the universal joint.

6. In a machine of the character described, the combination of a drum, comprising two end members and removable peripheral sections, clips permanently secured to said sections for reception of molds, a cone within the drum connected to one of said end members, a bipartite shaft traversing and connected to the end members, a universal joint within the drum at the junction of the shaft members, a slidable bearing carrying one end of one shaft member, a driving shaft, reducing gearing between the latter and the bipartite shaft, a cam shaft, a cam thereon, reducing gearing between the drum shaft and cam shaft, a rocking lever operated by said cam, and a connection between said lever and the aforesaid sliding bearing, substantially as described.

In witness whereof we have signed this specification in the presence of two witnesses.

GEORGE SAMUEL BAKER.
GEORGE WILLIAM PERKS.

Witnesses:
H. D. JAMESON,
F. L. RAND.